(12) United States Patent
Demaj et al.

(10) Patent No.: US 10,863,018 B2
(45) Date of Patent: *Dec. 8, 2020

(54) METHOD FOR MANAGING A REAL TIME DETECTION OF A SCENE BY A WIRELESS COMMUNICATION APPARATUS AND CORRESPONDING APPARATUS

(71) Applicant: STMicroelectronics (Rousset) SAS, Rousset (FR)

(72) Inventors: Pierre Demaj, Nice (FR); Laurent Folliot, Gourdon (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,954

(22) Filed: Jan. 28, 2020

(65) Prior Publication Data

US 2020/0169631 A1 May 28, 2020

Related U.S. Application Data

(63) Continuation of application No. 15/799,152, filed on Oct. 31, 2017, now Pat. No. 10,560,564.

(30) Foreign Application Priority Data

Mar. 2, 2017 (FR) ...................... 17 51693

(51) Int. Cl.
*H04M 1/725* (2006.01)
*G01D 21/02* (2006.01)
(Continued)

(52) U.S. Cl.
CPC ........ *H04M 1/72569* (2013.01); *G01D 21/02* (2013.01); *G06F 3/017* (2013.01);
(Continued)

(58) Field of Classification Search
CPC ......... H04M 1/72569; H04M 1/72572; H04M 2250/12; H04M 1/725; H04M 152/0258;
(Continued)

(56) References Cited

U.S. PATENT DOCUMENTS 7,616,965 B2 * 11/2009 Rudravaram et al. ...... 455/456.1
9,467,805 B2 * 10/2016 Farris ...................... H04W 4/02
(Continued)

FOREIGN PATENT DOCUMENTS

CN 103424756 A 12/2013
CN 103582093 A 2/2014

OTHER PUBLICATIONS

Galeana-Zapien, Hiram, et al., "Mobile Phone Middleware Architecture for Energy and Context Awareness in Location-Based Services", Sensors vol. 14, No. 12, Dec. 10, 2014, pp. 23673-23696.
(Continued)

*Primary Examiner* — Meless N Zewdu
(74) *Attorney, Agent, or Firm* — Slater Matsil, LLP

(57) ABSTRACT

A method of real-time scene detection performed by a wireless communication device includes, performing a first scene detection measurement to determine that the wireless communication device is located in a first scene. The first scene detection measurement is performed at first instant in time. The first scene is a type of environment. The method further includes associating the first scene with a corresponding reference scene of a predetermined set of reference scenes, determining a reference duration associated with the corresponding reference scene, and performing a second scene detection measurement immediately following expiration of the reference duration measured from the first instant in time.

23 Claims, 2 Drawing Sheets

(51) Int. Cl.
*H04W 4/02* (2018.01)
*H04W 12/00* (2009.01)
*H04W 4/029* (2018.01)
*H04W 52/02* (2009.01)
*G06F 9/445* (2018.01)
*G06F 3/01* (2006.01)
*G06K 9/00* (2006.01)
*H04W 4/38* (2018.01)
*H04W 56/00* (2009.01)
*H04W 4/33* (2018.01)
*H04W 4/23* (2018.01)

(52) U.S. Cl.
CPC ..... *G06F 9/44505* (2013.01); *G06K 9/00664* (2013.01); *H04M 1/72572* (2013.01); *H04W 4/023* (2013.01); *H04W 4/027* (2013.01); *H04W 4/029* (2018.02); *H04W 12/00502* (2019.01); *H04W 52/0209* (2013.01); *H04M 2250/12* (2013.01); *H04W 4/23* (2018.02); *H04W 4/33* (2018.02); *H04W 4/38* (2018.02); *H04W 52/02* (2013.01); *H04W 56/008* (2013.01); *H04W 56/0085* (2013.01)

(58) Field of Classification Search
CPC ......... H04M 15/8356; H04M 3/42348; H04W 4/023; H04W 52/0258; H04W 52/02; H04W 4/025; H04W 4/029; H04W 56/008; H04W 56/0085; H04W 56/00; H04W 4/38; H04W 4/50; H04W 4/027; H04W 4/043; H04W 52/0254; H04W 52/0261; H04W 4/20; H04W 52/0209; H04W 4/33; H04W 12/00504; H04W 12/00502; H04W 88/02; H04W 88/08; H04W 76/38; H04W 4/23; H04W 4/02; H04W 12/00; H04W 4/14; H04W 4/30; H04W 4/80; H04W 8/18; H04W 64/00; H04W 88/00; H04W 12/00503; G01D 21/02; G01D 4/14; G06K 9/00664; G06K 9/00; G06K 9/00671; G06K 9/00677; G06K 9/00684; G06K 9/00691; G06K 9/00697; G06K 9/00704; G06K 9/00711; G06F 9/445; G06F 3/01; G06F 9/44505; G06F 3/017; H04L 67/22; H04L 67/325
See application file for complete search history.

(56) References Cited

U.S. PATENT DOCUMENTS

| | | | |
|---|---|---|---|
| 9,773,313 B1* | 9/2017 | Klingner et al. | G06T 7/0024 |
| 10,127,632 B1* | 11/2018 | Burke et al. | G06T 3/4038 |
| 10,136,393 B2 | 11/2018 | Demaj et al. | |
| 10,147,399 B1* | 12/2018 | Mott et al. | G09G 5/377 |
| 10,410,321 B2* | 9/2019 | Ilic et al. | G06T 3/4038 |
| 10,739,142 B2* | 8/2020 | Meier et al. | G01C 21/206 |
| 2002/0149679 A1* | 10/2002 | Deangelis et al. | 348/207.99 |
| 2007/0037605 A1 | 2/2007 | Logan | |
| 2007/0140648 A1 | 6/2007 | Takahashi | |
| 2011/0214072 A1* | 9/2011 | Lindemann et al. | 715/757 |
| 2013/0064380 A1 | 3/2013 | Mahowald | |
| 2013/0238535 A1 | 9/2013 | Leppanen et al. | |
| 2013/0242074 A1* | 9/2013 | Sekiguchi et al. | G06K 9/00369 |
| 2013/0314278 A1 | 11/2013 | Lim et al. | |
| 2013/0314566 A1* | 11/2013 | Walker et al. | H04N 5/23229 |
| 2014/0010407 A1* | 1/2014 | Sinha et al. | 382/103 |
| 2014/0045537 A1 | 2/2014 | Luther et al. | |
| 2014/0066093 A1* | 3/2014 | Yoo et al. | G01S 5/0018 |
| 2014/0185866 A1* | 7/2014 | Lin | G06T 7/2013 |
| 2015/0004956 A1 | 1/2015 | Aksamit | |
| 2016/0019465 A1 | 1/2016 | Milton et al. | |
| 2016/0021357 A1 | 1/2016 | Alrajab | |
| 2016/0026253 A1* | 1/2016 | Bradski et al. | G06F 3/017 |
| 2016/0379058 A1* | 12/2016 | Tainsh et al. | G06K 9/00765 |
| 2017/0054899 A1* | 2/2017 | Sadhwani et al. | H04N 5/23222 |
| 2017/0180929 A1 | 6/2017 | Cavendish et al. | |
| 2018/0068206 A1 | 3/2018 | Pollach et al. | |
| 2018/0218791 A1 | 8/2018 | Rubin et al. | |

OTHER PUBLICATIONS

Guinness, Robert E., "Beyond Where to How: A Machine Learning Approach for Sensing Mobility Contexts Using Smartphone Sensors", Sensors 2015, vol. 15, No. 5, Apr. 28, 2015, pp. 9962-9985.
Lee, Meeyeon, et al., "Analysis of Characteristics of Power Consumption for Context-Aware Mobile Applications", vol. 5, No. 4, Nov. 14, 2014, pp. 612-621.
Santos, Andre C., et al. "A Domain-Specific Language for the Specification of Adaptable Context Inference", 2011 IFIP Ninth International Conference on Embedded and Ubiquitous Computing, Oct. 24, 2011, pp. 268-273.
Santos, Andre C., et al., "Context Inference for Mobile Applications in the UPCASE project", Second International Conference, Mobilware 2009, Berlin, Germany, Apr. 28-29, 2009 Proceedings, pp. 352-365.
Galeana-Zapien, Hiram, et al., "Mobile Phone Middleware Architecture for Energy and Context," Open Access Sensors, ISSN 1424-8220, Sep. 8, 2014, 26 pages.

* cited by examiner

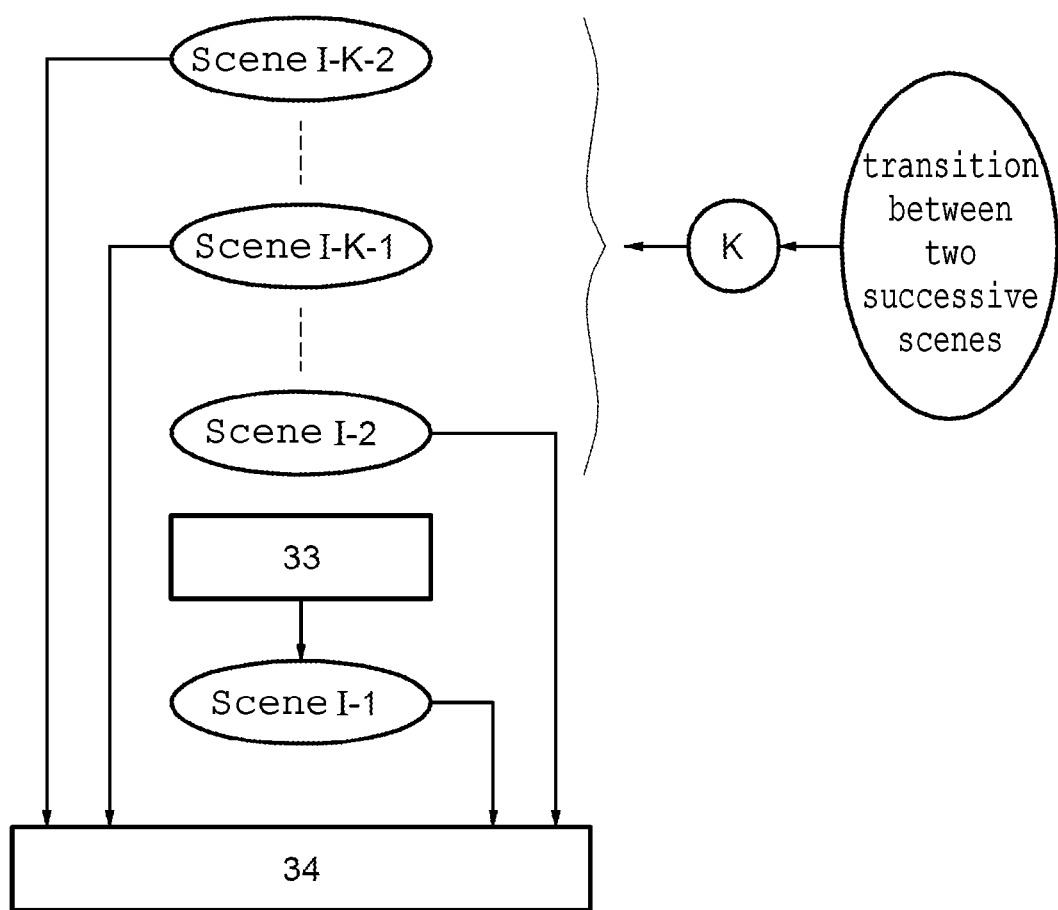

METHOD FOR MANAGING A REAL TIME DETECTION OF A SCENE BY A WIRELESS COMMUNICATION APPARATUS AND CORRESPONDING APPARATUS

This application is a continuation application of U.S. application Ser. No. 15/799,152, filed on Oct. 31, 2017 which claims priority French Patent Application No. 1751693, filed on Mar. 2, 2017, which applications are hereby incorporated herein by reference in their entirety.

TECHNICAL FIELD

Implementations and embodiments of the invention relate to managing the real-time detection of a scene by a wireless communication apparatus.

BACKGROUND

Some wireless communication apparatuses, e.g., some types of smartphones or tablets, are capable of scene detection for determining the environment in which the phone or tablet user is located. This may thus allow a third party, e.g., an advertiser or a cultural organization, to send relevant information connected with the place where the user of the apparatus is located.

Thus, for example, if the user is located at a given tourist site, they may thus be sent restaurant addresses in the vicinity of the place where they are located. Similarly, they may also be sent information relating to certain historic buildings which are located in the vicinity of the place where they are located.

It is also possible for certain settings to be performed automatically by phone (e.g., with the aid of an audio sensor the location is detected as being quiet and the phone places itself in vibration mode).

Currently, scene detection by phone may be performed at set intervals. However, this does not offer any flexibility which may lead to an undue consumption of current detrimental to the longevity of the phone battery.

Another solution may be to use the GPS application on the phone to be able to locate the user in real time and therefore the scene detected.

However, here again, the use of the GPS function is detrimental to the phone's consumption.

SUMMARY

Implementations and embodiments of the invention relate to managing the real-time detection of a scene by a wireless communication apparatus, e.g., an intelligent mobile cellular phone (smartphone) or a digital tablet, provided with at least one environmental measurement sensor, e.g., an accelerometer.

Embodiments improve decision-making regarding the detection of a scene by a wireless communication apparatus, e.g., a mobile cellular phone or a tablet, which allows greater flexibility and has a reduced impact on current consumption.

And, according to one implementation and embodiment, at least one previously detected scene will be used, and more generally multiple previous scenes to improve decision-making and to best follow changes of scene while saving energy in the absence of any change of scene.

Thus, according to one aspect, a method is provided for managing a real-time detection of at least one scene by a wireless communication apparatus. The method includes a succession of steps of scene detection spaced apart by time intervals and an adjustment of the time interval separating a current step of scene detection from the previous step of scene detection according to an adjustment criterion linked to at least one previous scene actually detected.

This previous scene actually detected is in general the scene actually previous to the current scene, but could be another previous scene, in the case, for example, where the scene actually previous to the current scene would not be usable for various reasons or would present an anomaly, for example, or would be detected with low confidence.

Scene detection is notably understood to mean a discrimination of the scene in which the wireless communication apparatus is located. Several known solutions exist for detecting (discriminating) a scene. These solutions use, for example, one or more dedicated sensors generally associated with a specific algorithm.

These sensors may be, notably in applications requiring very little current consumption, environmental measurement sensors, e.g., accelerometers and/or gyroscopes and/or magnetometers and/or microphones. This is a multimodal approach. And in this case an example of a specific algorithm may be an algorithm implementing a binary decision tree on the basis of descriptors or attributes resulting from particular processing (e.g., filtering) on the raw data from the sensors. These descriptors may be, for example, averages, energy values, variances, etc.

Environmental measurement sensor is understood to mean notably any type of sensor capable of providing information on the environment in which the wireless communication apparatus is located, including, for example, spatiotemporal characteristics of the environment of the apparatus, e.g., the temporally frozen or not frozen character of the environment, the speed of evolution of spatiotemporal change in the environment (from detecting the movement of the apparatus) and/or sound and/or spatial and/or visual characteristics of this environment, e.g., the noise level of the environment and/or the altitude and/or the brightness level of the environment (from, for example, sensors such as barometers, proximity sensors, optical sensors, etc.).

The sensor or sensors used for scene detection may be different from the environmental sensor or sensors.

However, notably in a context where the device is constantly powered up (Always-On) and where the battery life is an important criterion, at least one of the environmental sensors may also be a sensor used for scene detection. This may be the case, for example, but not restrictively, for an accelerometer that can be used both as an environmental sensor for indicating the intensity of movement of the apparatus and as a sensor helping in scene detection.

Multiple adjustment criteria are possible for deciding on changing the time interval separating a current step of scene detection from the previous step of scene detection. The presence of a particular signal may, for example, be detected from a particular sensor meaning a particular change in the environment of the scene requiring either a more frequent scene detection or authorizing a less frequent scene detection. This particular sensor, e.g., an accelerometer or a gyroscope, may be an activity detector in which the output indicates the rapidity of change in the environment.

However, according to one implementation, when each scene actually detected belongs to a set, or corpus, of reference scenes, each reference scene is associated with a reference duration and the adjustment criterion linked to the at least one previous scene actually detected is a duration which is obtained from at least one of the reference durations.

According to one implementation, the adjustment may be according to at least one adjustment criterion linked to K previous scenes actually detected, K being an integer greater than 1.

The use of K previous scenes actually detected is advantageous, notably in the case where the previous scene is detected with a low confidence. Indeed in this case the decision-making on these K scenes in a way allows filtering of the detected scene or scenes with a low confidence.

Thus, for example, a scene may be considered as actually detected, which is majoritively detected among the K previous scenes and the adjustment criterion of this majority scene is the one adopted.

The value of K may also vary according to the nature of the transition between two successive previous scenes actually detected.

Thus if, for example, the transition reveals that there is a change from a quasi-static scene to a rapidly evolving scene, the value of K may be increased.

According to one implementation in which the apparatus is provided with at least one environmental measurement sensor, each step of scene detection is advantageously performed from measurement values issued by the at least one environmental measurement sensor.

The at least one environmental measurement sensor may include at least one accelerometer and/or at least one audio sensor.

According to one implementation in which the wireless communication apparatus is provided with multiple environmental measurement sensors, each step of scene detection is advantageously performed from measurement values issued by the sensors.

The environmental measurement sensors may be selected from the group formed by an accelerometer, a gyroscope, a magnetometer, an audio sensor, a barometer, a proximity sensor, and an optical sensor.

In other words, one or more accelerometers or one accelerometer in combination with a gyroscope optionally in combination with a magnetometer or multiple audio sensors or one or more audio sensors in combination with one or more accelerometers, or one gyroscope or one magnetometer may be used.

Each step of scene detection may advantageously include an implementation of a classification algorithm or classifier, and preferably an implementation of a meta classification algorithm or meta classifier which performs, for example, a majority vote on the last five measurements in order to avoid aberrant errors, and which may preferably be reinitialized after each change in a time interval.

According to another aspect, a wireless communication apparatus is provided, including a detector configured for real-time detection of at least one scene, and a processing circuit configured to successively activate the detector so as to implement a succession of steps of scene detection spaced apart by time intervals and to perform an adjustment of the time interval separating a current step of scene detection from the previous step of scene detection according to at least one adjustment criterion linked to at least one previous scene actually detected.

According to one embodiment, the apparatus includes a memory configured for storing identifiers respectively associated with a set of reference scenes, each scene actually detected belonging to the set of reference scenes, each reference scene being associated with a reference duration, and the adjustment criterion linked to the at least one previous scene actually detected is a duration obtained from at least one of the reference durations.

According to one embodiment, the processing circuit is configured for performing the adjustment according to at least one adjustment criterion linked to K previous scenes actually detected, K being an integer greater than 1.

According to one embodiment, the processing circuit is configured for varying the value of K according to the nature of the transition between two successive previous scenes actually detected.

According to one embodiment in which the apparatus is provided with at least one environmental measurement sensor, the detector is configured for performing each step of scene detection from measurement values issued by the at least one environmental measurement sensor.

According to one embodiment, the at least one environmental measurement sensor comprises at least one accelerometer.

According to one embodiment the at least one environmental measurement sensor comprises at least one audio sensor.

According to one embodiment in which the apparatus is provided with multiple environmental measurement sensors, the detector is configured for performing each step of scene detection from measurement values issued by the sensors.

The environmental measurement sensors are, for example, selected from the group formed by an accelerometer, a gyroscope, a magnetometer, an audio sensor, a barometer, a proximity sensor, and an optical sensor.

According to one embodiment, the scene detector is configured for implementing a classification algorithm, e.g., a meta classification algorithm.

According to one embodiment, the processing circuit is configured for performing a reinitialization of the meta classification algorithm after each change in a time interval.

The apparatus may, for example, be a mobile cellular phone or a digital tablet.

BRIEF DESCRIPTION OF THE DRAWINGS

Other advantages and features of the invention will appear on examination of the detailed description of implementations and embodiments, in no way restrictive, and the attached drawings in which:

FIGS. 1 to 3 schematically illustrate various implementations and embodiments of the invention.

DETAILED DESCRIPTION OF ILLUSTRATIVE EMBODIMENTS

Figure 1:
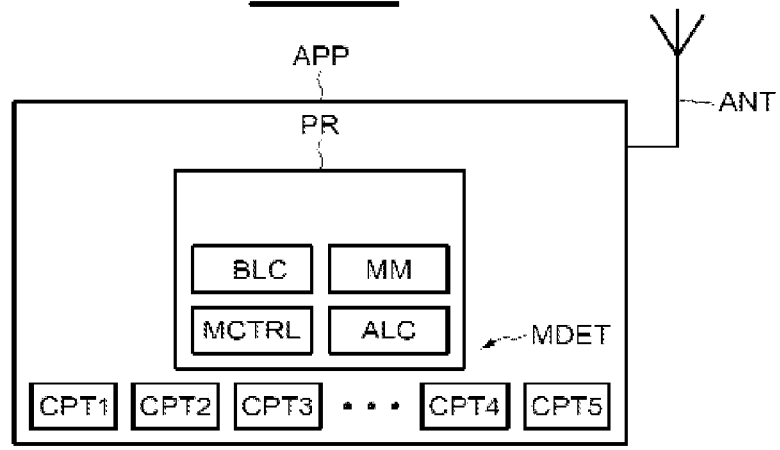

In FIG. 1, the reference APP designates an electronic apparatus, e.g., a wireless communication apparatus provided with an aerial ANT. This apparatus may be a mobile cellular phone such as a smartphone or a digital tablet.

The apparatus APP here comprises multiple environmental measurement sensors CPT1-CPT5, without this number being restrictive.

As a guide, the sensors CPT1, CPT2, CPT3, CPT4, CPT5 may be selected from the group formed by an accelerometer, a gyroscope, a magnetometer, an audio sensor such as a microphone, a barometer, a proximity sensor, and an optical sensor.

Of course, the apparatus may be provided with multiple accelerometers and/or multiple gyroscopes and/or multiple magnetometers and/or multiple audio sensors and/or a barometer, and/or one or more proximity sensors, and/or one or more optical sensors.

At least one and in general at least some of these environmental measurement sensors may, in particular in a multimodal approach, in combination with a conventional discrimination algorithm ALC, e.g., of the binary decision tree type, intended to work, for example, on filtered raw data from these sensors, form a detector MDET configured for detecting a scene. The detector MDET may thus, for example, detect whether the apparatus APP is located in this or that environment (restaurant, moving vehicle, etc.).

As a variant, the apparatus APP could be provided with a specific sensor, e.g., the sensor CPT1, different from the environmental sensors mentioned above, e.g., a micro camera, capable of detecting a scene of the environment of the apparatus.

However, in a context where the apparatus is constantly powered up (Always-On) and where the battery life is an important criterion, it is preferable to use one or more sensors of the environmental type mentioned above as sensors helping to detect a scene of the environment of the apparatus.

It is now assumed as a non-restrictive example that all the environmental sensors CPT1-CPT5 help in the detection of the scene and provide the discrimination algorithm ALC with data at measurement instants for detecting the scene.

The discrimination algorithm implemented in the scene detector MDET may be a classification algorithm or classifier which is an algorithm well known to the person skilled in the art. In this respect, the person skilled in the art for all useful purposes will be able to refer, for example, to the work by Jason Brownlee entitled "Master Learning Algorithms, discover how they work and implement them from scratch" (2016) to the article by André C. Santos and others entitled "Context Inference for Mobile Applications in the UPCASE project" Second International Conference, Mobilware 2009, Berlin, Germany, Apr. 28-29, 2009 Proceedings 352-365 pages, or to the article by Robert E. Guinness entitled "Beyond Where to How: A Machine Learning Approach for Sensing Mobility Contexts Using Smartphone Sensors", Sensors 2015, 15, 9962-9985.

As part of a particularly simple implementation, a decision tree that has undergone a learning phase on a database of environmental sensor measurements may be used as a classifier. Such a decision tree is particularly simple to implement and only requires a few bytes of memory and a working frequency of less than 0.01 MHz.

However, it is preferable to use a meta classification algorithm (or meta classifier) also well known to the person skilled in the art which, for example, will perform a majority vote on the last five measurements provided by the sensors, for example, so as to avoid aberrant errors.

Whilst at least one accelerometer or even multiple accelerometers may be used, there will be more details if a gyroscope or even a magnetometer is also used.

However, it may be particularly useful to use audio sensors which are useful environment descriptors. Indeed, if the apparatus is not moving, then the audio sensor may be useful for detecting the nature of this environment. Of course, according to the applications, either environmental sensors of the accelerometer or gyroscope or magnetometer type may be used, or audio sensors or a combination of these two types of sensors. However, with a view to simplifying the classifier, it may be advantageous to choose not to adopt a multimodal approach, i.e. not to use a combination of these two types of sensors.

In addition to these sensors, the apparatus APP comprises a block BLC capable of cooperating with the sensors CPT1 and the detector MDET for processing the detected scene and transmitting the information via the aerial ANT of the apparatus.

The apparatus also comprises a processing circuit MCTRL configured for successively activating the detector MDET so as to implement a succession of steps of scene detection spaced apart by time intervals and for performing an adjustment of the time interval separating a current step of scene detection from the previous step of scene detection according to at least one adjustment criterion linked to at least the previous scene actually detected.

In the example described here, the apparatus APP also comprises a memory MM configured for storing identifiers respectively associated with a set, or corpus, of reference scenes SR, each reference scene being associated with a reference duration.

These reference scenes which have been obtained by the detector during a learning phase may be, for example, without this being restrictive, "BUS", "OFFICE", "RESTAURANT", "TRAIN" scenes representative of the environment in which the apparatus is located.

Of course the reference durations associated with these scenes vary according to the nature of the reference scene.

Thus the reference duration associated with a stable scene, e.g., the "OFFICE" scene will be longer than the reference duration of a scene open to rapid evolutions, e.g., the "TRAIN" or "BUS" scene.

In fact, as will be seen later, this reference duration will determine the time interval between two detections of successive scenes.

Indeed, in the embodiment described here, each scene actually detected belongs to the set of reference scenes, and the adjustment criterion linked to a previous scene actually detected is the corresponding reference duration.

These various components BLC, ALC and MCTRL are, for example, implemented by software modules within the processor PR of the apparatus APP. A non-transitory computer-readable storage medium can store the software modules to be executed by the processor.

Figure 2:
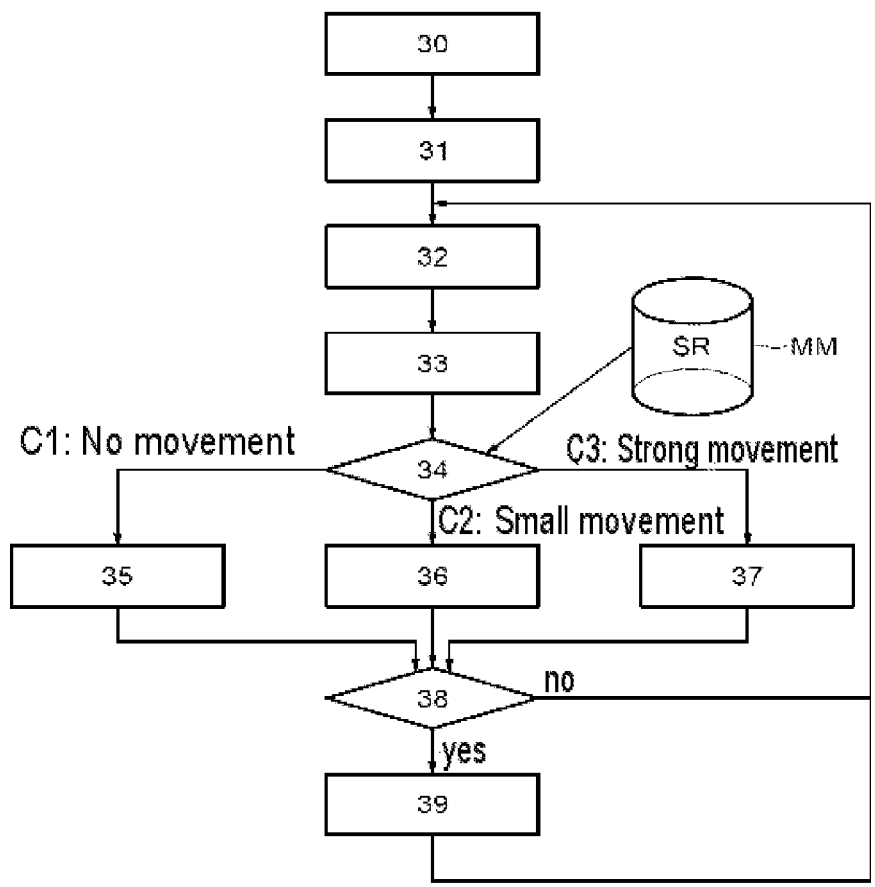

More particular reference is now made to FIG. 2 for describing an implementation of the method according to the invention.

This is implemented, for example, by a state machine. After an initialization phase 30, in a step 31, a default initial value is set for the time interval between two instants of scene detection by the detector MDET. This default initial value may be of the order of a few seconds, e.g., 2, 4, or 6 seconds.

Then, at the end of each time interval (step 32) the measurement values provided by the environmental sensors are acquired (step 33) and the current scene is detected using the classifier or the meta-classifier.

And, in a step 34, it is determined to which reference scene (SR) the scene that has just been detected corresponds.

It would then be possible to set the value of the time interval separating the scene detection that has just taken place from the following scene detection at the reference duration associated with the corresponding reference scene.

However, in the case where there are numerous reference scenes, it may be simpler to define subsets, e.g., three sub-sets, of reference scenes corresponding, for example, to classes of environment variations.

Thus, for example, it is possible to define a class C1 corresponding to a scene environment considered to be stable, containing, for example, the "OFFICE" and "RESTAURANT" scenes, a Class C2 corresponding to a scene environment considered to be rapidly evolving, containing, for example, the "TRAIN" scene, and a Class C3 corresponding to a scene environment considered to be intermediate i.e. evolving less rapidly, containing, for example, the "BUS" scene.

The reference duration associated with a class may then be taken, for example, as the average of the reference durations of each scene in the class or the minimum reference duration or the maximum reference duration, without these examples being restrictive.

According to the class obtained at the end of step 34, three different values will be defined for the time interval separating the instant of detecting the current scene from the instant of detecting the following scene.

Thus, in step 35 a value may be set for a time interval of the order of 10 seconds while this value may be set at 6 seconds in step 36 and two seconds in step 37.

In other words, the more rapid the movement, the more the time interval between two detections of successive scenes will be reduced.

In step 38, it is verified whether this value of time interval has been changed with respect to the previously stored value.

If such is the case, then in step 39, the classifier is reinitialized before returning to step 32.

Otherwise, the classifier is not reinitialized.

If in the newly executed step 33 it is considered that the scene detected is the current scene, then it is clear that the time interval taken into account in step 32 has been adjusted according to an adjustment criterion linked to the previous scene detection performed in the previous step 33.

Whereas in the implementation that has just been described the time interval between two detections of successive scenes is adjusted from the previously detected scene, it would be possible, as illustrated in FIG. 3, to determine in steps 34 to 37, the value of the time interval which will separate the detection of the scene I-1 performed in step 33 from the detection of the following scene I, which will be performed in the following step 33, from K previously detected scenes, here the K scenes I-K-2 to I-2.

Several possibilities are offered in this respect. Two non-exhaustive examples are mentioned below.

The average of the reference durations associated with the corresponding K reference scenes may be calculated.

From among the K previous scenes the one that is majoritively present may also be taken and then the corresponding class C1, C2 or C3 determined.

Of course the K previous scenes may or may not be consecutive for at least some of them.

Furthermore the value of K may vary according to the nature of the transition between two successive previous scenes actually detected.

Thus if, for example, the transition reveals that there is a change from a quasi-static scene to a rapidly evolving scene, the value of K may be increased for adjusting the time interval that will be used for the following scene detections.

What is claimed is:

1. A method of real-time scene detection performed by a wireless communication device, the method comprising:
at a first instant in time, performing a first measurement with an environmental detector to determine that the wireless communication device is located in a first scene, the first scene being a type of environment;
associating the first scene with a corresponding reference scene of a predetermined set of reference scenes;
determining a reference duration associated with the corresponding reference scene; and
immediately following expiration of the reference duration measured from the first instant in time, performing a second measurement with the environmental detector.

2. The method of claim 1, further comprising:
performing K previous measurements with the environmental detector prior to the first instant in time to determine that the wireless communication device is located in K previous scenes, K being a positive integer;
associating each of the K previous scenes with a respective reference scene of the predetermined set of reference scenes; and
wherein determining the reference duration comprises determining the reference duration associated with the corresponding reference scene and with each respective reference scene of the K previous scenes.

3. The method of claim 2, further comprising:
determining a transition of the wireless communication device between two scenes; and
varying K according to a nature of the transition.

4. The method of claim 1, wherein performing the first measurement comprises activating the environmental detector.

5. The method of claim 1, wherein the environmental detector comprises an audio sensor.

6. The method of claim 1, wherein the environmental detector comprises a sensor selected from a group consisting of an accelerometer, a gyroscope, a magnetometer, a barometer, a proximity sensor, and an optical sensor.

7. The method of claim 1, wherein the type of environment comprises a bus environment, an office environment, a restaurant environment, or a train environment.

8. The method of claim 1, wherein the environmental detector comprises a plurality of sensors, wherein each of the plurality of sensors is selected from a group consisting of an accelerometer, a gyroscope, a magnetometer, a barometer, a proximity sensor, and an optical sensor.

9. A wireless communication apparatus comprising:
an environmental detector configured for real-time scene detection;
a processor; and
a non-transitory computer-readable storage medium storing a program to be executed by the processor, the program including instructions to
at first instant in time, activate the environmental detector to perform a first measurement to determine that the wireless communication apparatus is located in a first scene, the first scene being a type of environment,
associate the first scene with a corresponding reference scene of a predetermined set of reference scenes,
determine a reference duration associated with the reference scene, and
immediately following expiration of the reference duration measured from the first instant in time, activate the environmental detector to perform a second measurement.

10. The wireless communication apparatus of claim 9, wherein the program includes further instructions to:
perform K previous measurements with the environmental detector prior to the first instant in time to determine that the wireless communication apparatus is located in K previous scenes, K being a positive integer;
associate each of the K previous scenes with a respective reference scene of the predetermined set of reference scenes; and wherein the instructions to determine the reference duration comprise determining the reference duration associated with the corresponding reference scene and with each respective reference scene of the K previous scenes.

11. The wireless communication apparatus of claim 10, wherein the program includes further instructions to:
determine a transition of the wireless communication apparatus between two scenes; and
vary K according to a nature of the transition.

12. The wireless communication apparatus of claim 9, wherein the environmental detector comprises an audio sensor.

13. The wireless communication apparatus of claim 9, wherein the environmental detector comprises a plurality of environmental measurement sensors, each environmental measurement sensor of the plurality of the environmental measurement sensors comprising a sensor selected from the group consisting of an audio sensor, an accelerometer, a gyroscope, a magnetometer, a barometer, a proximity sensor, and an optical sensor.

14. The wireless communication apparatus of claim 9, wherein the type of environment comprises a bus environment, an office environment, a restaurant environment, or a train environment.

15. The wireless communication apparatus of claim 9, wherein the environmental detector comprises a plurality of sensors, wherein each of the plurality of sensors is selected from a group consisting of an accelerometer, a gyroscope, a magnetometer, a barometer, a proximity sensor, and an optical sensor.

16. A method of real-time scene detection performed by a wireless communication device, the method comprising:
activating an environmental detector to perform a first measurement;
determining that the wireless communication device is located in a first scene according to the first measurement using a meta classification algorithm, the first scene being a type of environment;
associating the first scene with a corresponding reference scene of a predetermined set of reference scenes;
adjusting a time interval to equal a reference duration associated with the corresponding reference scene, the time interval separating successive scene detection measurements; and
reinitializing the meta classification algorithm after adjusting the time interval.

17. The method of claim 16, further comprising:
activating one or more additional environmental detectors along with the environmental detector to perform the first measurement.

18. The method of claim 16, wherein the environmental detector comprises an accelerometer.

19. The method of claim 16, wherein the environmental detector comprises an audio sensor.

20. The method of claim 16, wherein the environmental detector comprises a sensor selected from a group consisting of a gyroscope, a magnetometer, a barometer, a proximity sensor, and an optical sensor.

21. The method of claim 16, further comprising:
activating the environmental detector to perform K previous measurements, K being a positive integer;
determining that the wireless communication device is located in K previous scenes;
associating each of the K previous scenes with a respective reference scene of the predetermined set of reference scenes; and
wherein the reference duration is associated with the corresponding reference scene and with each respective reference scene of the K previous scenes.

22. The method of claim 16, wherein the type of environment comprises a bus environment, an office environment, a restaurant environment, or a train environment.

23. The method of claim 16, wherein the environmental detector comprises a plurality of sensors, wherein each of the plurality of sensors is selected from a group consisting of an accelerometer, a gyroscope, a magnetometer, a barometer, a proximity sensor, and an optical sensor.

* * * * *